United States Patent [19]

Anders

[11] 4,285,652
[45] Aug. 25, 1981

[54] GRANULATING APPARATUS

[75] Inventor: Dietmar Anders, Hanover, Fed. Rep. of Germany

[73] Assignee: Hermann Berstorff Maschinenbau GmbH, An der Breiten Wiese, Fed. Rep. of Germany

[21] Appl. No.: 48,762

[22] Filed: Jun. 14, 1979

[51] Int. Cl.³ ............................................. B29C 17/14
[52] U.S. Cl. .................................. 425/311; 264/142; 425/313
[58] Field of Search ................. 425/313, 67, 107, 311, 425/314, 173; 264/142

[56] References Cited

U.S. PATENT DOCUMENTS

| | | | |
|---|---|---|---|
| 1,701,744 | 2/1929 | Becker | 425/309 |
| 1,773,552 | 8/1930 | Sizer | 425/309 |
| 2,614,290 | 10/1952 | Street | 425/311 |
| 3,230,582 | 1/1966 | Hoffman et al. | 425/67 |
| 3,266,090 | 8/1966 | Gosney | 425/67 |
| 3,317,957 | 5/1967 | Heston et al. | 425/67 |
| 3,355,767 | 12/1967 | Niemeyer | 425/313 |
| 3,685,751 | 8/1972 | Anders | 241/256 |
| 4,182,605 | 1/1980 | Dettmer | 425/311 |
| 4,184,833 | 1/1980 | Buchan et al. | 425/311 |

FOREIGN PATENT DOCUMENTS 328157  11/1972  U.S.S.R. .................. 425/309

*Primary Examiner*—Jay H. Woo
*Attorney, Agent, or Firm*—Schwartz, Jeffery, Schwaab, Mack, Blumenthal & Koch

[57] ABSTRACT

Granulating apparatus wherein a cutter shaft mounting a multi-blade cutting implement, bearing means for the cutter shaft and drive means therefor are combined into a unit, which unit is mounted so that it can be swivelled about a bearing surface adjacent a cutter plate to adjust the cooperation of the blades of the cutting implement with the cutting plate. Screw drives are preferably provided to effect the adjustment.

10 Claims, 4 Drawing Figures

GRANULATING APPARATUS

The invention relates to apparatus for granulating plastics melt and other materials.

Apparatus of this kind has been previously proposed comprising a granulating head having a cutting plate and a multiblade cutting implement mounted in front of the plate, and a housing surrounding the granulating head and having means for cooling and conveying away the granules chopped off.

Such apparatus is known from U.S. Pat. No. 3,317,957, but in such apparatus peripheral plane parallelism cannot be obtained between the cutting blades and cutting plate. If there are found to be different gaps between the individual cutting blades and the cutting plate as a result of manufacturing tolerances, there is no possibility of adjusting the blades to the plate. The plates can only be moved horizontally all together, and irregularities at one side cannot be dealt with.

The invention has among its objects to ensure that plane parallelism, i.e. an equal spacing around the periphery, is obtained between the rotating cutting blades and the cutting plate.

The invention further has among its objects to ensure good, exact cutting of plastics strands emerging from the cutting plate, without the polymer, part of which is highly fluid, smearing the cutting plate or forming snarls. It also seeks to lengthen the useful life of the cutting blades and plate.

According to the invention there is provided apparatus for granulating plastics melt and other materials, comprising a granulating head having a cutting plate and a multi-blade cutting implement cooperating with the cutting plate, a housing surrounding the granulating head and having means for cooling and conveying away the granules chopped off, in which a cutter shaft mounting the cutting implement and bearing means and drive means for the shaft are combined into a unit which unit is mounted so that it can be swivelled about a bearing surface adjacent the cutting plate to adjust the cooperation of the blades of the cutting implement with the cutting plate.

Preferably the bearing means comprises a bearing housing, bearings, a cutter shaft mounting blade holders and cutting blades fixed to the blade holders, a holding plate, an adjusting spindle and a guard ring.

The apparatus advantageously includes screw drives to effect swivelling adjustment of the cutter shaft, bearing means and drive meana about the bearing surface, the screw drives being mounted on an outer sleeve and engaging the holding plate.

Thus those parts of the cutter shaft, bearing means and drive means which are combined as a unit can be swivelled and adjusted by means of the screw drives and this enables the distance between the cutting blades and plate to be adjusted so that it is constant around the whole periphery.

Differences in the spacing can be made apparent by fastening a gap measuring instrument with a scale onto a blade holder and making the blade holder describe one complete revolution. The differences revealed by the reading can then be compensated for exactly by appropriate movement of the screw drives.

Advantageously the cutter shaft, bearing means and drive means are supported on a centering ring forming the bearing surface and are designed to be centered horizontally by the screw drives. Preferably plane parallelism to about 0.01 mm is obtained between the cutting blades and plate regardless of any manufacturing inaccuracies. This can ensure a clean cut, all the blades having the same clearance in each position, and extremely little wear on the blades and cutting plate.

The invention is diagrammatically illustrated by way of example in the accompanying drawings, in which.

Figure 1:
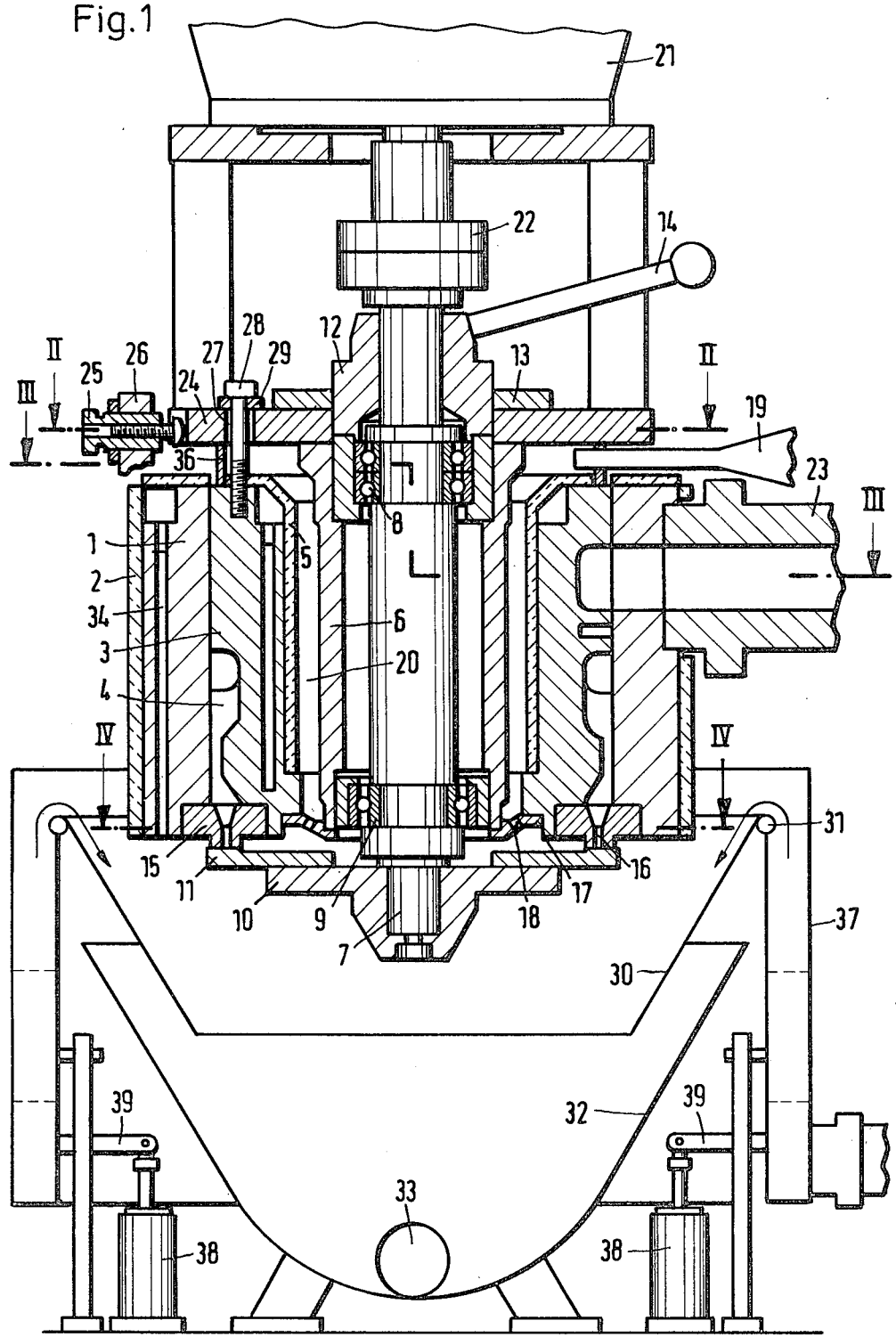
FIG. 1 is a longitudinal section through granulating apparatus according to the invention.

Referring to the drawings, granulating apparatus has an outer sleeve 1 with an insulating jacket 2 disposed around it. Guide passages 4 for material are provided in a guide sleeve 3. The sleeve 3 is clad with an insulating layer 5. A cutter shaft 7, mounted by bearings 8, 9, is disposed in a bearing housing 6. Blade holders 10 with blades 11 attached thereto are mounted on the lower end of the cutter shaft.

At the upper end of the cutter shaft 7 parallel axial adjustment means are provided comprising an adjusting spindle 12 and a guard ring 13 to arrest the cutter shaft. The adjusting spindle 12 can be rotated by means of a lever 14, to provide a coarse height adjustment of the cutting blades 11 with respect to a cutting plate 15.

Figure 4:
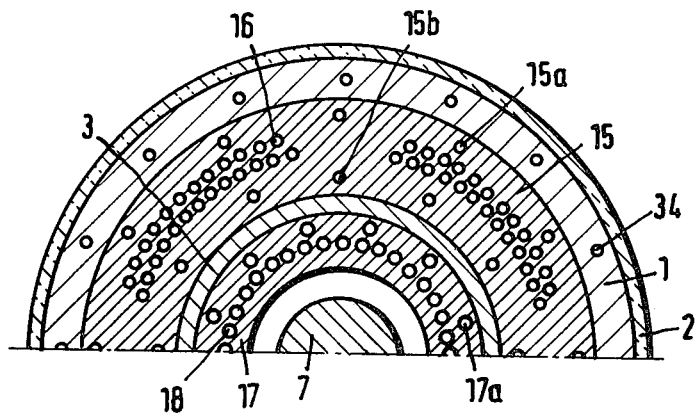
FIG. 4 is a cross-section taken on line IV—IV of FIG. 1.

The cutting plate 15 is located at the underside of the granulator with apertures 16 therein through which the material to be granulated is extruded. The cutting plate 15 is fixed to the outer sleeve 1 by screws 15a (FIG. 4) and to the guide sleeve 3 by screws 15b. The guide sleeve 3 is in turn fixed to a bearing by screws 17a, the bearing being formed by a resiliently deformable centering ring 17 with the bearing housing 6 supported on it. Holes 18 are provided in the ring 17 and are directed towards the blades 11.

Cooling air is blown into a cylindrical space 20 between the bearing housing 6 and the insulating layer 5 through a plurality of connections 19 distributed around the periphery. At the centering ring 17 side of the space 20 the cooling air is forced through the holes 18 toward the cutting blades. The space 20 is closed at the top by an annular wall 36 with the connections 19 leading to it.

The cutter shaft 7 can be rotated by a motor 21 by way of an interposed coupling 22 to compensate for vertical displacement of the shaft 7, and the rotation is transmitted through the holder 10 to the blades 11.

The liquid fused plastics material is pressed through an adapter 23 by an extruder (not shown) attached to it, into the material guide passages 4 and from there to the apertures 16 in the cutting plate 15.

As a means of obtaining plane parallelism between the cutting blades 11 and the cutting plate 15, the following components of the granulator are combined into a unit so as to swivel together as such:

The cutter shaft 7 with the blade holders 10 and cutting blades 11 attached to it, the upper and lower bearings 8 and 9 for the shaft 7, the bearing housing 6, an upper holding plate 24 fixed to the bearing housing 6, the coupling 22 connecting the cutter shaft 7 to the drive motor 21, and the adjusting spindle 12 with the guide ring 13, the drive motor 21.

The above listed components of the granulator, which are constructed as a unit, bear on the centering ring 17 by means of the bearing housing 6, are adjustable and can be swivelled to a limited extent about the resiliently deformable centering ring 17. The ability to swivel is provided by distributing a plurality of differential screw drives 25 around the periphery, the screw drives being joined to the outer sleeve 1 by holding means 26.

To enable the unit to swivel horizontally, apertures 27 are provided in the holding plate 24 to receive cheese head screws 28 the shanks of which are smaller in diameter than the diameter of the apertures 27. In this way the holding plate 24 can move horizontally to a limited extent. Plate springs 29 are disposed between the heads of the screws 28 driven into the guide sleeve 3 and the holding plate 24, and these springs compensate for expansion of the sleeve 3 in an upward direction.

Since the apertures 27 are larger than the diameter of the shanks of the screws 28, there is an appropriate adjusting path for the granulator components combined into a unit.

The granules chopped off are thrown outwardly in a radial direction by the centrifugal force of the cutting blades, and impinge on a surface 30 which is covered with a film of water overflowing a top edge 31 thereof. The film of water carries the chopped off granules downwardly into a granulating chamber 32, from which they can emerge through an outlet 33.

To enable the blades to be serviced, and particularly to enable differences in plane parallelism between the blades 11 and the cutting plate 15 to be detected, an outer casing 37 together with the surface 30 are mounted to be movable vertically by means of hydraulic cylinders 38 and a rod system 39. When the outer casing 37 is moved downwards, the cutting blades 11 and cutting plate 15 are freely accessible.

Figure 2:
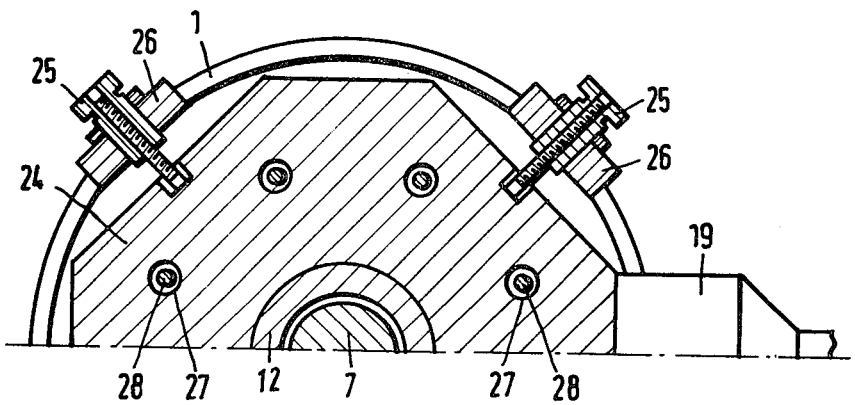
FIG. 2 is a cross-section taken on line II—II of FIG. 1.
Figure 3:
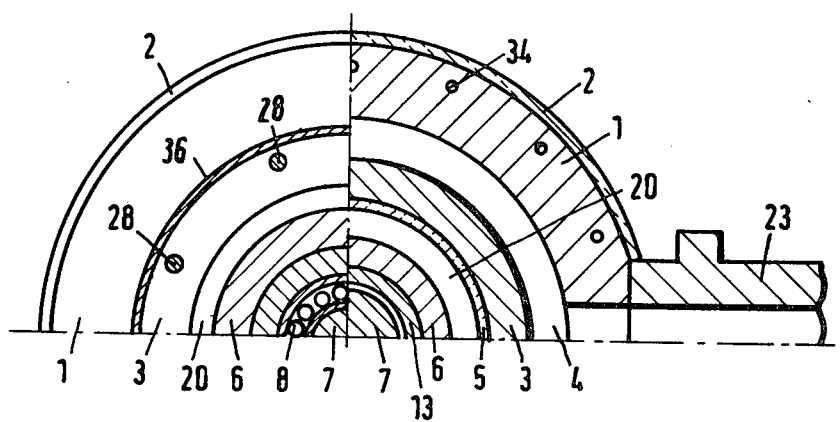
FIG. 3 is a cross-section taken on line III—III of FIG. 1.

In order to find any differences in plane parallelism between the cutting blades 11 and the cutting plate 15, a measuring instrument carrying a scale is mounted on one of the blade holders 10 and allowed to revolve once with the holder. By observing the scale any inaccuracies in plane parallelism between the cutting blades and cutting plate are thus made apparent. According to the values obtained in this way, the screw drives 25 are adjusted (FIG. 2), and abosolute plane parallelism can be established over the whole periphery, that is to say, the granulator components which are combined into a unit are swivelled and adjusted about the centering ring 17 according to the differences in plane parallelism found.

Since the bottom end of the cylindrical bearing housing 6 is horizontally disposed, substantially on the same plane as the cutting surface, the gap between the blades 11 and cutting plate 15 does not vary when the temperature of the guide sleeve 3 differs from that of the outer sleeve 1. A heating cartridge 34 is preferably provided to heat the outer sleeve 1.

What is claimed is:

1. Apparatus for granulating plastics melt and like materials, comprising a granulating head, a housing surrounding said granulating head, said housing including means for cooling and conveying away granulated material, a cutting plate on said granulating head, a rotatable cutter assembly, including a plurality of cutter blades cooperating with said cutting plate to granulate said materials, a rotatable cutter shaft on which said cutter assembly is mounted, drive means and bearing means for said shaft; said drive means, bearing means, shaft and cutter assembly being connected and operable as a unit, and mounting means for said unit including means providing a bearing surface adjacent said cutting plate such that said unit can be swivelled to adjust the cooperation of the blades of said cutter assembly with said cutting plate whereby the distance between said blades and said cutting plate can be maintained at a desired and constant spacing, and means operatively connected to said unit for effecting swivelling adjustment thereof.

2. The apparatus of claim 1, wherein said bearing surface is disposed substantially in the same plane as a cutting plane between said cutting plate and said cutting blades.

3. The apparatus of claim 1, wherein said cutting assembly includes blade holders mounted on said cutting shaft and mounting said cutter blades, and said bearing means comprises a bearing housing, bearings, a generally horizontally disposed holding plate, an adjusting spindle and a guard ring.

4. The apparatus of claim 1, wherein said drive means comprises a motor and a coupling to compensate for vertical displacement of said cutter shaft.

5. The apparatus of claim 1, wherein said bearing surface is formed by a resiliently deformable centering ring.

6. The apparatus of claim 3, wherein said bearing surface is formed by a resiliently deformable centering ring and said means for effecting swivelling movement of said unit includes screw drive means mounted on an outer sleeve and engaging said holding plate, whereby said holding plate thus can be moved horizontally to effect swivelling movement of said shaft and cutter blades.

7. The apparatus of claim 6, wherein said screw drive means comprise a plurality of differential screw drives engaging the periphery of said holding plate.

8. The apparatus of claim 6, further including a guide sleeve, screws joining said holding plate to said guide sleeve, spring elements disposed between heads of said screws and said holding plate, and apertures in said holding plate to receive said screws, with said apertures being of greater diameter than said screws to allow horizontal displacement of said holding plate.

9. The apparatus of claim 1, further including means for vertically moving said housing, whereby the components of said housing can be moved vertically with respect to said cutting implement and said cutting plate.

10. The apparatus of claim 1, wherein said means for effecting swivelling movement of said unit comprises a plurality of screw drive members spaced arcuately around said granulating head and exposed at the periphery thereof, each of said screw drive members engaging a holding plate disposed generally horizontally around said shaft above said bearing means, whereby said holding plate can be moved horizontally as desired to swivel said shaft and said cutter blades relative to said cutting plate thereby to reestablish the constant spacing between said blades and said cutting plate.

* * * * *